(12) United States Patent
Raja et al.

(10) Patent No.: US 10,462,254 B2
(45) Date of Patent: Oct. 29, 2019

(54) DATA SHARING METHOD AND ELECTRONIC DEVICE THEREOF

(71) Applicant: Samsung Electronics Co., Ltd., Suwon-si, Gyeonggi-do (KR)

(72) Inventors: Barath Raj Kandur Raja, Bangalore (IN); Adarsha Ananda, Bangalore (IN); Phani Avadooth Rekapalli Veera Venkata, Bangalore (IN); Raju Suresh Dixit, Bangalore (IN); Raghavendra Kulkarni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/671,089

(22) Filed: Mar. 27, 2015

(65) Prior Publication Data

US 2015/0281394 A1 Oct. 1, 2015

(30) Foreign Application Priority Data

Mar. 28, 2014 (IN) ............................ 1669/CHE/2014
Jan. 14, 2015 (IN) ............................ 1669/CHE/2014
Mar. 3, 2015 (KR) ........................ 10-2015-0029716

(51) Int. Cl.
*H04L 29/06* (2006.01)
*H04L 29/08* (2006.01)

(52) U.S. Cl.
CPC ........ *H04L 67/306* (2013.01); *H04L 67/1095* (2013.01)

(58) Field of Classification Search
CPC .... H04L 67/306; H04L 67/1095; H04L 29/08

USPC .......................................................... 709/204
See application file for complete search history.

(56) References Cited

U.S. PATENT DOCUMENTS

| 7,710,349 | B2 | 5/2010 | De Leon |
| 8,244,043 | B2 | 8/2012 | Chang et al. |
| 8,244,721 | B2 | 8/2012 | Morris et al. |
| 8,582,034 | B2 | 11/2013 | Kwong |
| 8,805,089 | B2 | 8/2014 | Chang et al. |
| 9,451,415 | B2 * | 9/2016 | Krishnaswamy ....... H04W 4/06 |
| 2003/0234953 | A1 * | 12/2003 | Dawson ............. H04N 1/00244 358/1.15 |
| 2007/0027960 | A1 * | 2/2007 | De Leon ........... H04L 29/06027 709/217 |

(Continued)

FOREIGN PATENT DOCUMENTS

WO 2013-098471 A1 7/2013

OTHER PUBLICATIONS

European Office Action dated Dec. 21, 2018; Application #: 15 769 614.7-1213; Ref. #: DS/P237551EP.

(Continued)

*Primary Examiner* — Moustafa M Meky
*Assistant Examiner* — Elizabeth Kassa
(74) *Attorney, Agent, or Firm* — Jefferson IP Law, LLP

(57) ABSTRACT

A data sharing method and an electronic device thereof are provided. The method includes communicating with a second electronic device and determining common interest information between a first user of the first electronic device and a second user of the second electronic device, and retrieving and sharing application data associated with the common interest information, with the second electronic device.

25 Claims, 9 Drawing Sheets

(56) References Cited

U.S. PATENT DOCUMENTS

| | | | |
|---|---|---|---|
| 2007/0033109 A1* | 2/2007 | Patten | G06F 21/6245 705/26.1 |
| 2007/0150607 A1* | 6/2007 | Flinchem | H04M 1/72547 709/228 |
| 2008/0034320 A1* | 2/2008 | Ben-Shachar | G06F 3/1454 715/790 |
| 2008/0209010 A1* | 8/2008 | Zitnick, III | G06F 17/30244 709/219 |
| 2008/0285527 A1 | 11/2008 | Sammarco | |
| 2009/0133069 A1 | 5/2009 | Conness et al. | |
| 2010/0220250 A1* | 9/2010 | Vanderwall | G01C 11/02 348/837 |
| 2011/0211737 A1* | 9/2011 | Krupka | G06F 16/58 382/118 |
| 2012/0069199 A1 | 3/2012 | Chang et al. | |
| 2012/0070090 A1* | 3/2012 | Chang | G06K 9/00 382/218 |
| 2012/0158743 A1* | 6/2012 | Gardner | G06F 17/30038 707/748 |
| 2013/0066908 A1* | 3/2013 | Niranjan | H04W 12/08 707/770 |
| 2013/0159883 A1* | 6/2013 | Yerli | G06Q 30/02 715/753 |
| 2014/0006434 A1* | 1/2014 | Chervirala | G06Q 30/02 707/758 |
| 2014/0068736 A1* | 3/2014 | Agerstam | H04W 12/06 726/7 |
| 2014/0351354 A1 | 11/2014 | Chandra et al. | |
| 2015/0074206 A1* | 3/2015 | Baldwin | H04L 51/10 709/206 |
| 2015/0095414 A1* | 4/2015 | Turbin | H04L 67/18 709/204 |
| 2015/0128222 A1* | 5/2015 | Festa | H04L 63/126 726/4 |
| 2017/0005976 A1* | 1/2017 | Liang | G06Q 50/01 |

OTHER PUBLICATIONS

Korean Office Action dated Jun. 12, 2019, issued in a counterpart Korean application No. 10-2015-0029716.

* cited by examiner

_US 10,462,254 B2_

DATA SHARING METHOD AND ELECTRONIC DEVICE THEREOF

CROSS-REFERENCE TO RELATED APPLICATION(S)

This application claims the benefit under 35 U.S.C. § 119(a) of an Indian provisional patent application filed on Mar. 28, 2014 in the Intellectual Property of India and assigned Serial number 1669/CHE/2014, under 35 U.S.C. § 119(a) of an Indian patent application filed on Jan. 14, 2015 in the Intellectual Property of India and assigned Serial number 1669/CHE/2014, and under 35 U.S.C. § 119(a) of a Korean patent application filed on Mar. 3, 2015 in the Korean Intellectual Property Office and assigned Serial number 10-2015-0029716, the entire disclosure of each of which is hereby incorporated by reference.

TECHNICAL FIELD

The present disclosure relates to a data sharing method and an electronic device thereof. More particularly, the present disclosure relates to a data sharing method for allowing a first user of a first electronic device and a second user of a second electronic device to efficiently retrieve and share application data of various contents of common interest in the first electronic device and the second electronic device, respectively.

BACKGROUND

Various electronic devices, such as a smart phone, a tablet Personal Computer (PC), and the like, are widely used. An electronic device can retrieve application data of various contents from various sources.

For example, the electronic device can access another electronic device or a server using a wired communication or various wireless communications, such as Wireless Fidelity (WiFi), Bluetooth (BT), infrared data communication, and the like.

The electronic device can select and retrieve a user's intended application data from application data of various contents, such as photos, music, messages, and the like, stored in the connected electronic device or a server.

However, it can be complicated and inaccurate to select and retrieve the desired application data in terms of the user. For example, it is quite complicated and inaccurate in terms of the user when a first user of a first electronic device and a second user of a second electronic device retrieve and share the application data of various contents, such as photos, music, a message of common interests, and the like, in the respective devices.

Therefore, a need exists for a data sharing method and an electronic device for allowing a first user of a first electronic device and a second user of a second electronic device to efficiently retrieve and share application data of various contents of common interest in the first electronic device and the second electronic device, respectively.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data sharing method and an electronic device for allowing a first user of a first electronic device and a second user of a second electronic device to efficiently retrieve and share application data of various contents of common interest in the first electronic device and the second electronic device, respectively.

In accordance with an aspect of the present disclosure, a method for operating a first electronic device is provided. The method includes communicating with a second electronic device and determining common interest information between a first user of the first electronic device and a second user of the second electronic device, and retrieving and sharing application data associated with the common interest information, with the second electronic device.

The determining can include analyzing application data corresponding to an application in the first electronic device, receiving application data corresponding to an application in the second electronic device, from the second electronic device, and determining the common interest information by comparing the analyzed and received application data.

Based on user profile information, the analyzing can analyze one or more of a frequency of accessing the application data, a data amount, and a relevancy between the first user and the second user.

The determining can determine the common interest information based on a user input from at least one of the first user of the first electronic device and the second user of the second electronic device, or a preset application.

The sharing can include retrieving and transmitting, at the first electronic device, application data associated with the common interest information to the second electronic device, and when the second electronic device retrieves and transmits application data associated with the common interest information, receiving, at the first electronic device, the application data.

The transmitting to the second electronic device can include retrieving, at the first electronic device, the application data associated with the common interest information, transmitting list information of the retrieved application data to the second electronic device, and transmitting application data requested by the second electronic device, to the second electronic device based on the list information.

The transmitting to the second electronic device can include retrieving, at the first electronic device, the application data associated with the common interest information, communicating with the second electronic device and receiving list information of the application data retrieved in the second electronic device, and based on the list information, transmitting application data not present in the second electronic device among the application data retrieved in the first electronic device, to the second electronic device.

The method can further include determining whether to share the application data, using device authentication between the first electronic device and the second electronic device or user authentication between the first user of the first electronic device and the second user of the second electronic device.

The user authentication can be performed based on profile information stored in the first electronic device and the second electronic device.

In accordance with an aspect of the present disclosure, a first electronic device is provided. The first electronic device includes a communication module, a display module, a storage, and a processor associated with the communication module, the display module, and the storage, wherein the processor communicates with a second electronic device through the communication module, determines common interest information between a first user of the first electronic device and a second user of the second electronic device, retrieves application data associated with the common interest information from the storage, and shares the application data with the second electronic device.

The processor can analyze application data corresponding to an application in the first electronic device, receive application data corresponding to an application in the second electronic device, from the second electronic device, and determine the common interest information by comparing the analyzed and received application data.

Based on user profile information, the processor can analyze one or more of a frequency of accessing the application data, a data amount, and a relevancy between the first user and the second user.

The processor can determine the common interest information based on a user input from at least one of the first user of the first electronic device and the second user of the second electronic device, or a preset application.

The processor can retrieve from the storage and transmits application data associated with the common interest information to the second electronic device, and when the second electronic device retrieve and transmit application data associated with the common interest information, receives the application data.

The processor can retrieve the application data associated with the common interest information from the storage, transmit list information of the retrieved application data to the second electronic device, and transmit application data requested by the second electronic device, to the second electronic device based on the list information.

The processor can retrieve the application data associated with the common interest information from the storage, receive list information of the application data retrieved by the second electronic device by communicating with the second electronic device, and based on the list information, transmit application data not present in the second electronic device among the application data retrieved from the storage, to the second electronic device.

The processor can determine whether to share the application data, using device authentication between the first electronic device and the second electronic device or user authentication between the first user of the first electronic device and the second user of the second electronic device.

The user authentication can be performed based on profile information stored in the first electronic device and the second electronic device.

The first electronic device and the second electronic device can create one user group in a certain region, and in different regions, create one user group through a network server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
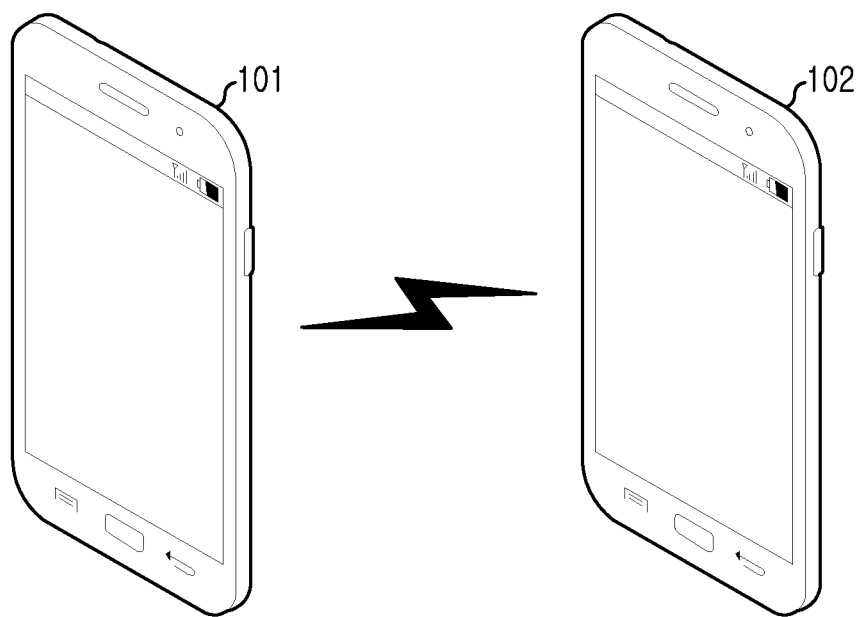
FIG. 1 illustrates a wireless communication of a first electronic device and a second electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure can be a device including communication functionality. For example, the electronic device can combine one or more of various devices, such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG-1 or MPEG-2) Audio Layer 3 (MP3) player, a mobile medical appliance, an electronic bracelet, an electronic necklace, an electronic appcessory, camera, a wearable device, an electronic clock, a wrist watch, a smart white appliance (e.g., a refrigerator, an air conditioner, a vacuum cleaner, an artificial intelligence robot, a television (TV), a Digital Video Disc (DVD) player, an audio system, an oven, a microwave oven, a washing machine, an air purifier, a digital frame, and the like), various medical appliances (e.g., a Magnetic Resonance Angiography (MRA), a Magnetic Resonance Imaging (MRI), a Computed Tomography (CT), an X-ray, an ultrasonicator, and the like)), a navigation device, a Global Positioning System (GPS) receiver, an Event Data Recorder (EDR), a Flight Data Recorder (FDR), a set-top box, a TV box (e.g., Samsung HomeSync™, AppleTV™, or Google TV™), an electronic dictionary, an in-vehicle infotainment device, an electronic equipment for a ship (e.g., a marine navigation device, a gyro compass, and the like), avionics, a security device, electronic textiles, a digital key, a camcorder, a game console, a Head-Mounted-Device (HMD), a flat panel display device, a digital album, a part of furniture or building/structure having the communication functionality, an electronic board, an electronic signature receiving device, a projector, and the like. Those skilled in the art shall understand that the electronic device according to embodiments of the present disclosure is not limited those devices.

FIG. 1 illustrates a wireless communication of a first electronic device and a second electronic device according to an embodiment of the present disclosure.

Figure 2:
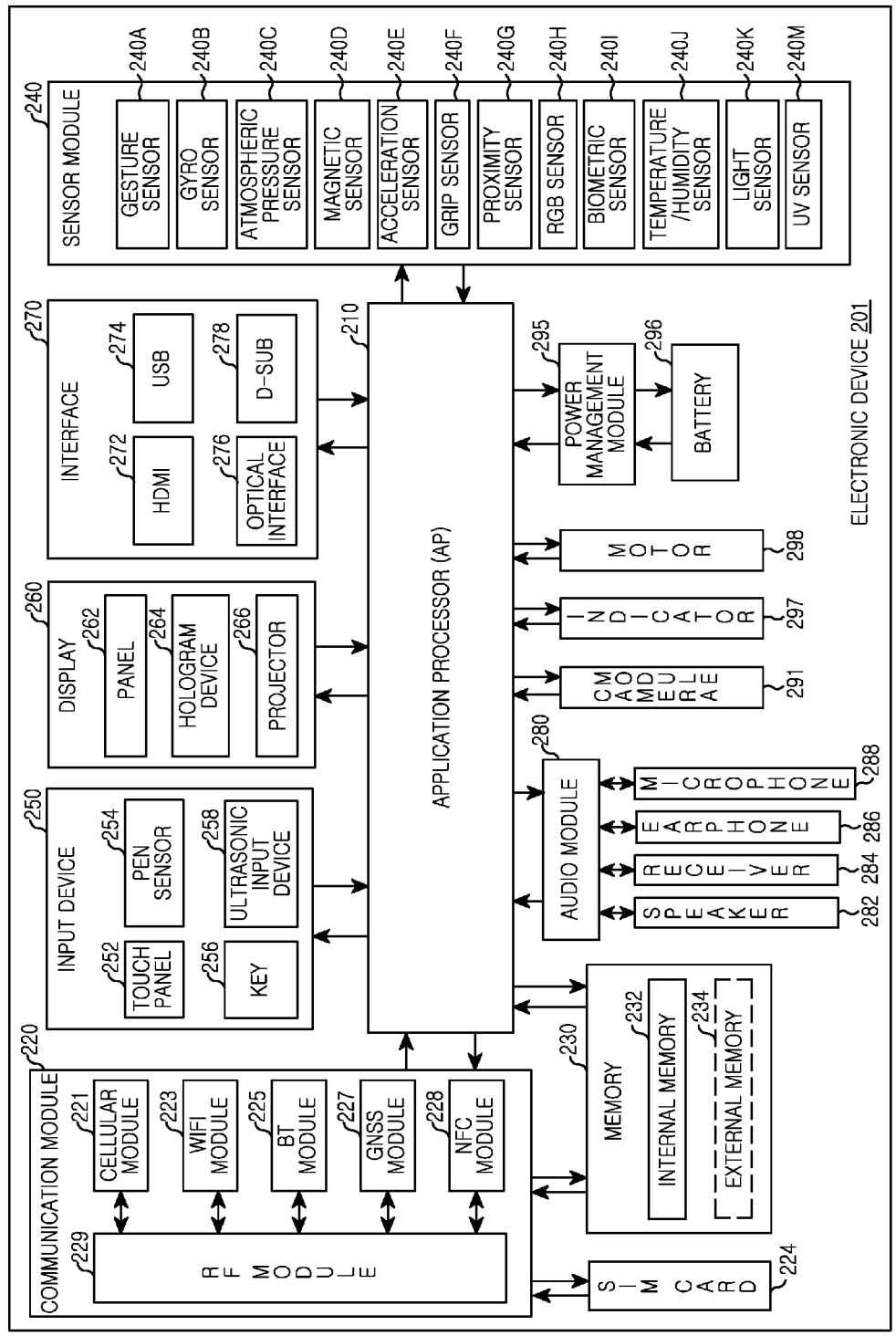
FIG. 2 is a block diagram of an electronic device according to an embodiment of the present disclosure.

FIG. 2 is a block diagram of an electronic device according to an embodiment of the present disclosure. An electronic device 201 can include, for example, whole or part of an electronic device 101 of FIG. 1.

Referring to FIG. 2, the electronic device 201 can include one or more processors (e.g., Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 can control hardware or software components connected to the processor 210 by driving an operating system or an application program, and carry out various data processing and operations including multimedia data. The processor 210 can be implemented using, for example, a System on Chip (SoC). The processor 210 can further include a Graphical Processing Unit (GPU) and/or an image signal processor. The processor 210 may include at least part (e.g., a cellular module 221) of the components of FIG. 2. The processor 210 can load and process an instruction or data received from at least one of the other components (e.g., a non-volatile memory), in a volatile memory, and store various data in the non-volatile memory.

The communication module 220 can include the cellular module 221, a wireless fidelity (WiFi) module 223, a Bluetooth (BT) module 225, a Global Navigation Satellite System (GNSS) module 227 (e.g., a GPS module, a Glonass module, a Beidou module, a Galileo module, and the like), a Near Field Communication (NFC) module 228, and a Radio Frequency (RF) module 229.

The cellular module 221 can provide a voice call, a video call, a text message service, or an Internet service over a communication network. The cellular module 221 can identify and authenticate the electronic device 201 in the communication network using the SIM (e.g., a SIM card). The cellular module 221 can perform at least part of functions provided by the processor 210. For example, the cellular module 221 can include a Communication Processor (CP).

The WiFi module 223, the BT module 225, the GNSS module 227, and the NFC module 228 each can include, for example, a processor for processing the data transmitted and received through the corresponding module. At least part (e.g., two or more) of the cellular module 221, the WiFi module 223, the BT module 225, the GNSS module 227, and the NFC module 228 can be included in a single Integrated Chip (IC) or an IC package.

The RF module 229 can transmit and receive communication signals (e.g., RF signals). The RF module 229 can include, for example, a transceiver, a Power Amp Module (PAM), a frequency filter, a Low Noise Amplifier (LNA), and an antenna, which are not shown. Alternatively, at least one of the cellular module 221, the WiFi module 223, the BT module 225, the GNSS module 227, and the NFC module 228 can transmit and receive the RF signals through a separate RF module.

The SIM 224 can include a SIM card and/or an embedded SIM, and contain unique identification information (e.g., an Integrated Circuit Card Identifier (ICCID)) or subscriber information (e.g., International Mobile Subscriber Identity (IMSI)).

The memory 230 (e.g., the memory 130) can include an internal memory 232 or an external memory 234. For example, the internal memory 232 can include at least one of the volatile memory (e.g., a Dynamic RAM (DRAM), a Static RAM (SRAM), a Synchronous Dynamic RAM (SDRAM), and the like), the non-volatile memory (e.g., a One-Time Programmable ROM (OTPROM), a Programmable ROM (PROM), an Erasable and Programmable ROM (EPROM), an Electrically Erasable and Programmable ROM (EEPROM), a mask read only memory (ROM), a flash ROM, and a flash memory (e.g., a NAND flash or a NOR flash)), a hard drive, and a Solid State Drive (SSD).

The external memory 234 can include a flash drive, for example, a Compact Flash (CF), a Secure Digital (SD), a Micro-(SD), a Mini-SD, an extreme digital (xD), a Multi-MediaCard (MMC), a memory stick, and the like. The external memory 234 can be connected functionally and/or physically to the electronic device 201 through various interfaces.

The sensor module 240 can measure a physical quantity or detect an operation status of the electronic device 201, and convert the measured or detected information to an electric signal. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., Red Green Blue (RGB) sensor), a biometric sensor 240I, a temperature/humidity sensor 240J, an illuminance sensor 240K, or an UltraViolet (UV) sensor 240M. Additionally or alternatively, the sensor module 240 can include, for example, an E-noise sensor, an electromyography (EMG) sensor, an electroencephalogram (EEG) sensor, an electrocardiogram (ECG) sensor, an Infra-Red (IR) sensor, an iris sensor, and/or a finger scan sensor. The sensor module 240 can further include a control circuit for controlling sensor module 240's one or more sensors. The electronic device 201 can further include a processor for controlling the sensor module 240, as part of or apart from the processor 210. When the processor 210 is sleeping, the processor can control the sensor module 240.

The input device 250 can include a touch panel 252, a (digital) pen sensor 254, a key 256, and an ultrasonic input device 258. For example, the touch panel 252 can employ at least one of capacitive, resistive, infrared, and ultrasonic wave techniques. In addition, the touch panel 252 may further include a control circuit. The touch panel 252 can further include a tactile layer and provide a tactile response to the user.

The (digital) pen sensor 254 can be part of the touch panel or include a separate recognition sheet. The key 256 can include, for example, a physical button, an optical key, or a keypad. The ultrasonic input device 258 can detect microwaves from an input tool through a microphone (e.g., a microphone 288) and obtain data corresponding to the detected microwaves.

The display 260 can include a panel 262, a hologram device 264, or a projector 266. The panel 262 can be implemented, for example, flexibly, transparently, or wearably. The panel 262 may be constructed as the single module with the touch panel 252. The hologram device 264 can present a three-dimensional image in the air using interference of light. The projector 266 can display the image by projecting the light onto a screen. The screen can be placed, for example, inside or outside the electronic device 201. The display 260 can further include a control circuit for controlling the panel 262, the hologram device 264, or the projector 266.

The interface 270 can include, for example, a High-Definition Multimedia Interface (HDMI) 272, a Universal Serial Bus (USB) 274, an optical interface 276, or a D-subminiature (D-sub) 278. Additionally or alternatively, the interface 270 can include, for example, a Mobile High-Definition Link (MHL) interface, an SD card/MMC interface, or an Infrared Data Association (IrDA) standard interface.

The audio module 280 can convert sound to an electric signal and vice versa. The audio module 280 can process sound information which is input or output through, for example, a speaker 282, a receiver 284, an earphone 286, or the microphone 288.

The camera module 291 can capture a still picture and a moving picture and include one or more image sensors (e.g., a front sensor or a rear sensor), a lens, an Image Signal Processor (ISP), or a flash (e.g., a Light Emitting Diode (LED) or a xenon lamp).

The power management module 295 can manage power of the electronic device 201. The power management module 295 can include a Power Management Integrated Circuit (PMIC), a charger Integrated Circuit (IC), a battery 296, or a fuel gauge. The PMIC can use a wired charging type and/or a wireless charging type. The wireless charging type includes, for example, a magnetic resonance type, a magnetic induction type, and a microwave type, and can add an additional circuit for the wireless charging, for example, a coil loop, a resonance circuit, or a rectifier. The battery gauge 296 can, for example, measure the remaining capacity of the battery 296 and the voltage, the current, or the temperature of the charging. The battery 296 can include, for example, a rechargeable battery and/or a solar battery The indicator 297 can display a specific status of the electronic device 201 or a part of the electronic device 201 (e.g., the processor 210), for example, a booting state, a message state, or a charging state. The motor 298 can convert the electric signal to a mechanic vibration, and generate vibration or haptic effect. Although it is not illustrated, the electronic device 201 can include a processing device (e.g., a GPU) for supporting mobile TV. The processing device for supporting the mobile TV can process media data in conformity to a standard, for example, Digital Multimedia Broadcasting (DMB), Digital Video Broadcasting (DVB), or MediaFlo™.

The aforementioned components of the electronic device according to various embodiments of the present disclosure each can include one or more components, and the name of the corresponding component can differ according to the type of the electronic device. The present electronic device can include at least one of the aforementioned components, omit some components, or further include other components. In addition, some of the components of the present electronic device can be united into a single entity to thus carry out the same functions of the corresponding components.

A first category C1 can retrieve combinatorial data, and a second category C2 can determine a priority of an application based on the combinatorial data.

The first category C1 can be divided to a first classification C1C1 and a second classification C1 C2. The first classification C1C1 can retrieve combinatorial data between users, and the second classification C1C2 can retrieve combinatorial data between contents.

The first classification C1C1 can be divided into first, second, and third subclassifications C1C1SC1, C1C1SC2, and C1C1SC3. The first subclassification C1C1SC1 can retrieve combinatorial data from the same application, the second subclassification C1C1SC2 can retrieve combinatorial data from different applications, and the third subclassification C1C1SC3 can share different data.

The second classification C1C2 can be divided into a first subclassification C1C2SC1 and a second subclassification and C1C2SC2. The first subclassification C1C2SC1 can identify the user from contact information, and the second subclassification C1C2SC2 can use logging.

The second category C2 includes a first classification C2C1 and can determine the priority of the application based on the priority defined using the combinatorial data.

The first classification C2C1 can be divided into first, second, and third subclassifications C2C1SC1, C2C1SC2, and C2C1SC3. The first subclassification C2C1SC1 can determine the priority based on a frequency, the second subclassification C2C1SC2 can determine the priority based on an amount, and the third subclassification C2C1SC3 can determine the priority based on a relevancy.

Referring to FIG. 1, the first electronic device 101 and a second electronic device 102 can be connected using the wired communication or the wireless communication. For example, the wired communication can use a Local Area Network (LAN) cable, and the wireless communication can use various radio communications, such as RF Identification (RFID), WiFi, Bluetooth, NFC, handshaking, and the like.

The first electronic device 101 is associated with a first user, and the second electronic device 101 is associated with a second user. The first user and the second user can be different from each other or the same person who uses the first electronic device 101 and the second electronic device 102 both.

The first electronic device 101 can store profile information of the first user, and the second electronic device 102 can store profile information of the second user. The profile information of the first user can include preference information and application history information of the first user.

The second user profile information can include preference information and application history information of the second user. The first user profile information and the second user profile information can be used to retrieve and share data between the first electronic device 101 and the second electronic device 102, and to authenticate the device or the user between the first electronic device 101 and the second electronic device 102.

The first electronic device 101 can store various data associated with the first user as the first user profile information, and the second electronic device 102 can store various data associated with the second user as the second user profile information. The first electronic device 101 can store data partially associated with the second user, and the second electronic device 101 can store data partially associated with the first user.

For example, the first electronic device 101 can store a first photo including only a face of the first user, as the first user data, and a second photo including the face of the first user, a face of the second user, and a face of a third user, as the data partially associated with the second user.

The second electronic device 102 can store a third photo including only the second user face, as the second user data, and a fourth photo including all of the second user face, the first user face, and a fourth user face, as the data partially associated with the first user.

For example, the first user face and the second user face are present in common in the second photo and the fourth photo but the second photo can be stored in the first electronic device 101 and the fourth photo can be stored in the second electronic device 102.

An image file corresponding to the photo can be associated and stored with various additional information, for example, tag information, such as date when the photo is taken, time when the photo is taken, and place where the photo is taken, person name who took the photo, and the like. The electronic device, such as a smart phone, a tablet PC, and the like, can determine when, where, and with whom the corresponding photo is taken by obtaining the tag information.

Further, the electronic device may obtain features of the face in the corresponding photo by finely scanning the image file of the photo, compare the obtained features with features of faces registered in the pre-stored contact information, and thus determine whose face is included in the photo.

The first user and the second user can want to retrieve and share different photos (e.g., the second photo and the fourth photo) including their faces, as application data corresponding to the common interest.

The application data corresponding to the common interest of the first user and the second user can include various multimedia contents, such as photos, music, messages, and the like. Herein, the application data corresponding to the common interest can be referred to as common application data or combinatorial data (hereinafter, referred to as the combinatorial data).

At least one of the user profile information of the first electronic device 101 and the user profile information of the second electronic device 102 can be stored in a server in the network. The user profile information stored in the server can be accessed and shared at the initial communication of the first electronic device 101 and the second electronic device 102.

When the first electronic device 101 and the second electronic device 102 are connected to each other, the first electronic device 101 analyzes the application data (e.g., an image file) corresponding to at least one application (e.g., the photo) installed therein.

Herein, the application data can be present as multimedia content data in the profile information of the first user. The first electronic device 101 can include one or more user profile information and one or more applications.

The user profile information can be associated with one or more applications in each device. The application data can be associated with a particular application individually or with a plurality of applications respectively. The first electronic device 101 can access the first user profile information, identify the application accessed by the first user, and analyze the application data relating to the application.

The second electronic device 102 can access the second user profile information, identify the application accessed by the second user, and analyze the application data relating to the application.

The application data analyzed by the first electronic device 101 and the application data analyzed by the second electronic device 102 are compared in both of the first electronic device 101 and the second electronic device 102, in either the first electronic device 101 or the second electronic device 102, or by the server in the network accessed by at least one of the first electronic device 101 and the second electronic device 102.

The application data analyzed by the first electronic device 101 and the application data analyzed by the second electronic device 102 are compared manually based on the user input from one of the first user and the second user or automatically based on a certain application.

Based on the comparison of the analyzed application data, the combinatorial data corresponding to the common interest of the first user and the second user can be retrieved in the first electronic device 101 and the second electronic device 102 respectively.

Herein, the combinatorial data can include one or more of a set of data files corresponding to the application data defining the common interest of the first user and the second user, and a set of data files corresponding to the application data defining non-common interest of the first user and the second user.

The common interest of the first user and the second user can be determined based on the user profile information, for example, based on various factors, such as frequency of accessing the combinatorial data from the at least one application, amount of the combinatorial data present in the at least one application, and relevancy of the combinatorial data between the first user and the second user.

The combinatorial data can be retrieved based on at least one of user authentication on the first user and the second user and device authentication on the first electronic device and the second electronic device. The retrieved combinatorial data can be displayed on a display of at least one of the first electronic device and the second electronic device, or the displays of the first electronic device and the second electronic device.

For example, the combinatorial data of the common interest can be displayed at the top of the display and the combinatorial data of the non-common interest can be displayed at the bottom of the display in the first electronic device and the second electronic device, and vice versa.

The first electronic device 101 and the second electronic device 102 can ask about user preference before displaying the combinatorial data, and display the combinatorial data in various fashions according to a user's selection.

When the data files of the combinatorial data are displayed, the first user and the second user can select and share the data files. For example, the first electronic device and the second electronic device can be placed in a certain region (e.g., a concert hall or a part) and share the data files.

The first electronic device 101 and the second electronic device 102 in different regions can access their user profile information through the server in the network, identify data relating to the first user and the second user, and retrieve and share the corresponding combinatorial data.

The method for retrieving the combinatorial data based on fusion of the first electronic device and the second electronic device can be present as an inbuilt function within the devices. The devices can identify a particular user action.

For example, the particular action can be identified when the user touches a shortcut icon, touches a particular key, taps the first electronic device at the second electronic device, brings the devices close within a certain proximity, inputs a voice command, or inputs a user's touch sign.

According to the identified action, the first electronic device 101 and the second electronic device 102 can determine whether the user wants to retrieve the combinatorial data. For example, the particular action can tap the devices or handshake in the proximity.

The combinatorial data retrieving based on the fusion between the first electronic device 101 and the second electronic device 102 can be performed by a particular application in the first electronic device 101 and the second electronic device 102. For example, the particular application can be downloaded from the server in the network and pre-installed in the respective electronic devices at the initial communication before the combinatorial data is shared between the first electronic device 101 and the second electronic device 102.

A security service for the data sharing of the first electronic device 101 and the second electronic device 102 can be strengthened. For example, the particular application can strengthen the security service by, before retrieving and sharing the combinatorial data, accessing the particular application, requesting for user consent, or requesting the user authentication before attempting to access other device.

The user authentication can adopt various methods, such as profile logging using user name and password, email ID entering, fingerprint scanning, iris scanning, voice detection, One Time Password (OTP) input, and the like.

The authentication can be applied to at least one of the security accessing and the combinatorial data sharing. More electronic devices can be additionally connected to the first electronic device 101 and the second electronic device 102. The more electronic devices connected can analyze mutual data, compare the analyzed data with other electronic devices, and then share the combinatorial data by displaying and retrieving the data.

Figure 3:
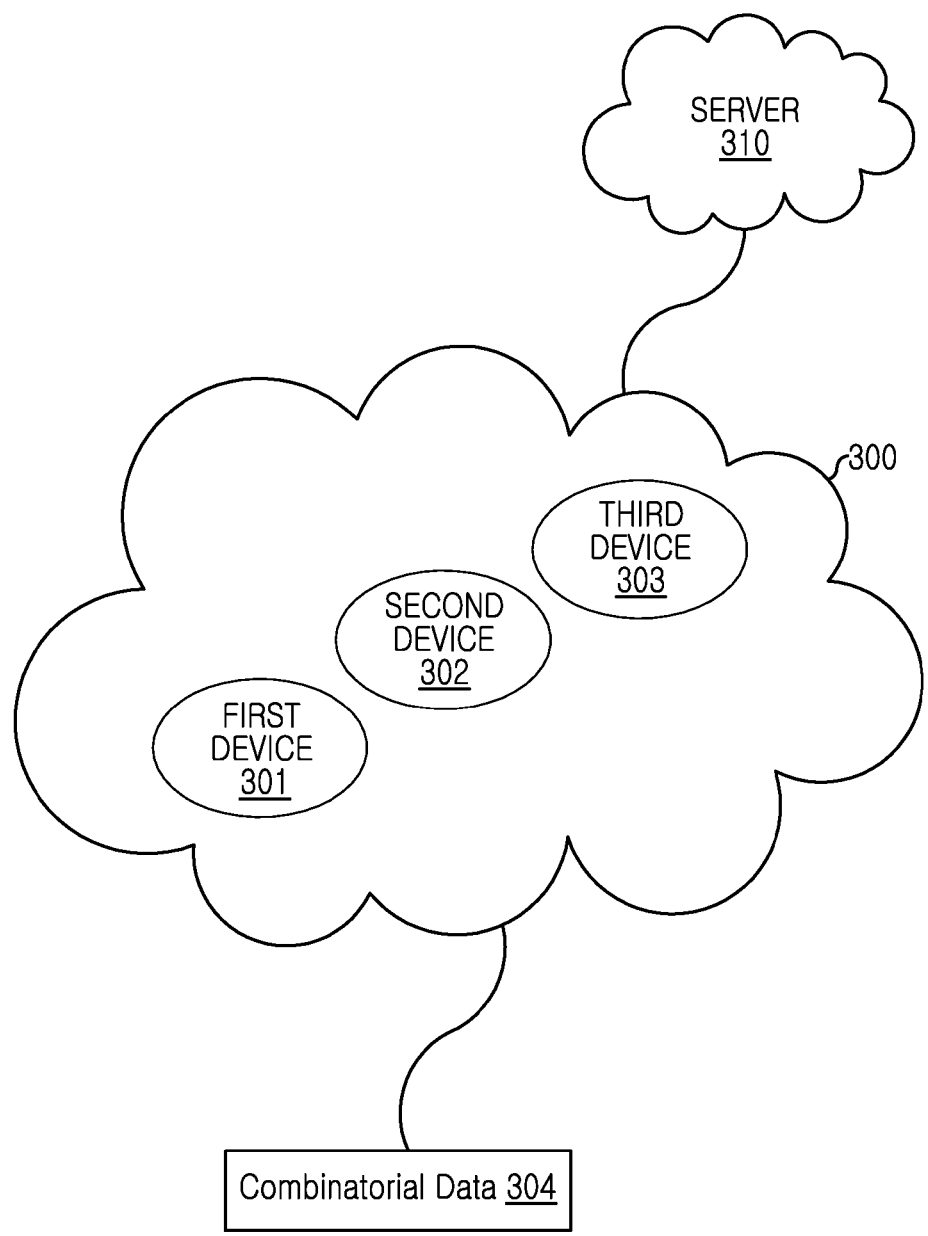
FIG. 3 illustrates a network architecture for retrieving and sharing combinatorial data in a user group according to an embodiment of the present disclosure.

FIG. 3 illustrates a network architecture for retrieving and sharing combinatorial data in a user group according to an embodiment of the present disclosure.

Referring to FIG. 3, a first electronic device 301 associated with a first user, a second electronic device 302 associated with a second user, and a third electronic device 303 associated with a third user can create a user group 300 through the wired communication or the wireless communication.

At least one of the first, second, and third electronic devices 301, 302, and 303 of the user group 300 can access a server 310 in the network. The first, second, and third electronic devices 301, 302, and 303 can be placed together in a certain region (e.g., a travel site, a concert hall, a park, and the like), and retrieve and share combinatorial data 304 of the common interest of the users in the respective electronic devices.

One (e.g., the first electronic device 301) or more of the first, second, and third electronic devices 301, 302, and 303 can be placed in a different region from the other electronic devices (e.g., the second and third electronic devices 302 and 303). In this case, the electronic device (e.g., the first electronic device 301) in the different region can create the user group 300 by communicating with the other electronic devices (e.g., the second and third electronic devices 302 and 303) through the server 310 over the network, retrieve the combinatorial data 304 of the common interest of the users in the respective electronic devices, and share the combinatorial data 304 through the server 310.

To share the data with the other electronic devices, the first user of the first electronic device 301 can create the user group 300 by selecting one or more of the second electronic device 302 and the third electronic device 303.

The first user of the first electronic device 301 may create the user group 300 with one or more of the second electronic device 302 and the third electronic device 303 through the server 310.

As such, the first, second, and third electronic devices 301, 302, and 303 of the one user group 300 can determine common interest information for retrieving the combinatorial data of the common interest of the users according to the user input (e.g., a voice command or a specific action) input from at least one of the first, second, third users.

The user profile information stored in the first, second, and third electronic devices 301, 302, and 303 can be analyzed to thus perform the device authentication and/or the user authentication and to retrieve and share the combinatorial data of the common interest of the users.

Herein, the combinatorial data of the common interest can include various multimedia contents associated with the user preference information or use history information analyzed based on the user profile information.

One of the first, second, and third electronic devices 301, 302, and 303 of the user group 300, for example, the first electronic device 301 can serve as a host in the user group 300 and the remaining second and third electronic devices 302 and 303 can serve as clients.

For example, the first electronic device 301 serving as the host can form and retain the user group 300 by transmitting a ping signal to the second electronic device 302 and the third electronic device 303 serving as the clients and determining whether response signals corresponding to the ping signal are normally received from the second electronic device 302 and the third electronic device 303.

One of the first, second, and third electronic devices 301, 302, and 303 of the user group 300, for example, the first electronic device 301 can identify an application accessed by the first user or selected and executed by the first user, confirm application data associated with the identified application, and thus automatically generate and provide the preference information of the first user or the use history information corresponding to favorites of the first user.

For example, the first user can listen to a particular kind of songs, view a particular kind of videos, and visit a particular place and take a picture. In this case, the first electronic device 301 can identify the application accessed or executed by the first user, obtain the frequency of accessing the application data associate with the application, the data amount, and the relevancy with the other users, and thus automatically provide the preference information of the first user or the use history information corresponding to favorites of the first user.

The first user of the first electronic device 301 can have multiple profiles in a plurality of Social Networking Sites (SNSs). For example, the first user can have multiple profiles in various SNSs, such as Facebook, Google+, LinkedIn, and the like. For example, a single user can have multiple profiles in different SNSs and add different interest information.

For example, when the first electronic device 301 accesses the second electronic device 302 or the third electronic device 303 and tags various additional information, the preference information of the first user or the use history information, such as favorites can be shared with the second user of the second electronic device 302 or the third user of the third electronic device 303 and used to display the common interest information of the first user.

The first electronic device 301 can display a list of the use history information, such as a first user's favorites. For example, the first user can be guided to edit or create the favorites list. The favorites list can be displayed to the first user through a User Interface (UI) screen, the first user can select one or more items from the favorites list, and the favorites list can be shared with the other users.

The users of the electronic devices can have the same or different privacy levels, and the privacy level can individually allow or restrict the right to share whole or part of the user information.

The electronic devices of the user group 300 can be temporarily tagged or untagged by the user of the corresponding electronic device or the user of the other electronic device.

For example, during a long flight or a trekking trip with the second user of the second electronic device 302, the first user of the first electronic device 301 can create the user group 300 by tagging the second electronic device 302. When the journey is completed, the first user can easily release the user group 300 by un-tagging the second user.

In so doing, to obtain the common interest of the first user and the second user, a particular application in the first electronic device 301 and the second electronic device 302 can track history of profiles accessed by the first electronic device 301 and the second electronic device 302 and share the profile history.

Figure 4:
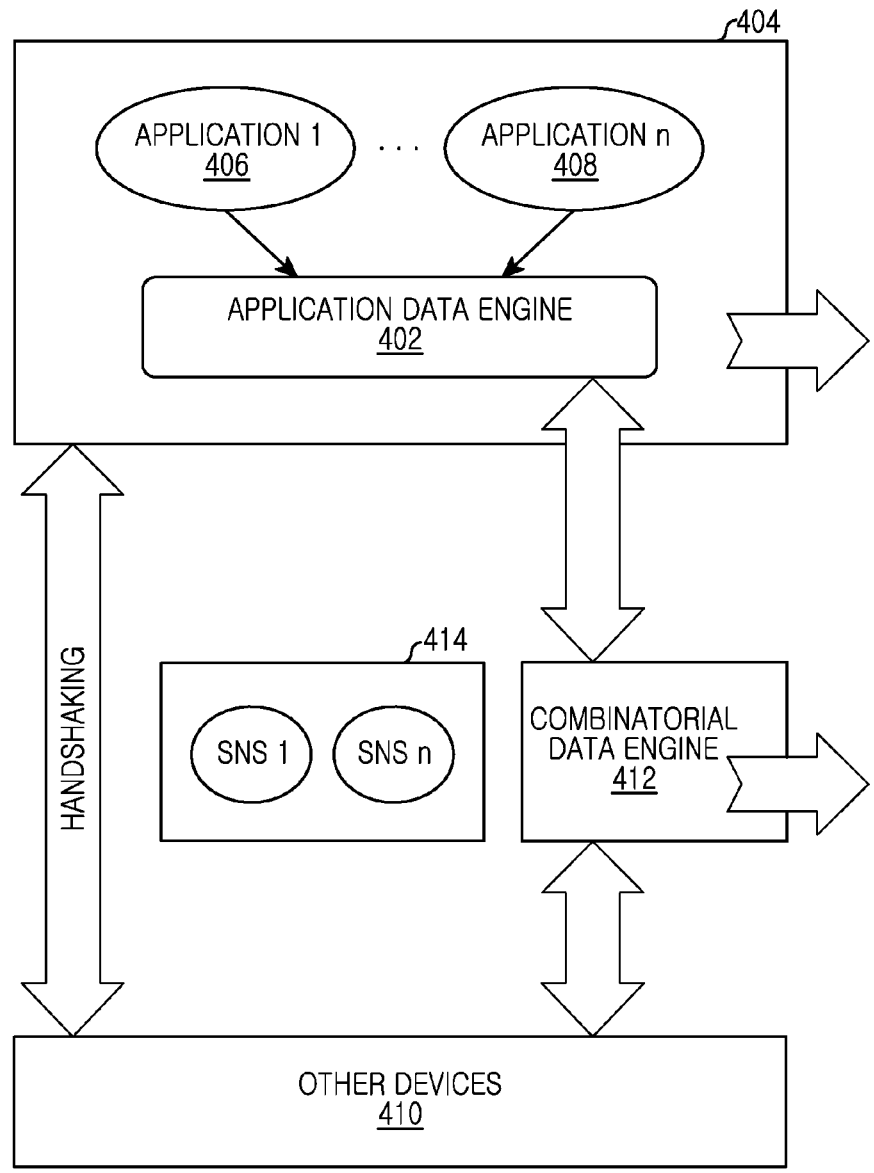
FIG. 4 is a block diagram of an application data engine and a combinatorial data engine according to an embodiment of the present disclosure.

FIG. 4 is a block diagram of an application data engine and a combinatorial data engine according to an embodiment of the present disclosure.

Referring to FIG. 4, an application data engine 402 can run on an electronic device 404.

One or more applications 406 and 408 running in the electronic device 404 can be associated with the application data engine 402. Herein, the application data engine 402 can determine inclusive combinatorial data by simultaneously processing a plurality of applications executed by multiple users. For example, the inclusive combinatorial data can be the combinatorial data of the common interest between the multiple users.

Referring to FIG. 4, the electronic device 404 can be associated with other electronic devices 401, a combinatorial data engine 412, and an SNS engine 414. The other electronic devices 401 can include a smart phone or a tablet PC used by at least one other user, and the SNS engine 414 can be associated with a plurality of SNSs. The application data engine 402 and the combinatorial data engine 412 can include, for example, software or firmware executed in a processor of the electronic device 404.

Each electronic device can individually determine whether to share application data of contents requiring privacy protection among the combinatorial data.

The electronic device 404 and the other electronic devices 410 can set the user group by accessing one another using the handshaking, which has been described earlier and shall not be further described to avoid repetition.

When the user group is set, the combinatorial data engine 412 can share contents of the electronic device 404 with the other electronic devices 410, process the inclusive combinatorial data extracted from the electronic devices, fetch exclusive combinatorial data, and share the combinatorial data among the electronic devices.

The exclusive combinatorial data can include, for example, contents corresponding to the common interest of the multiple users (e.g., users attending a party together) and contents yet unshared with the users (e.g., photos taken at the party and stored in the respective electronic devices).

The combinatorial data engine 412 can be present in one of the electronic devices 404 and 410. The combinatorial data engine 412 may be present in the server in the network, and the server can allow the electronic device 404 and the other electronic device 410 to communicate and share the combinatorial data.

The person having ordinary skills in the art can understand that the combinatorial data engine 412 can be present in any one of the electronic devices and can function to allow the users to share the combinatorial data, without departing from the scope of the present disclosure.

Figure 5:
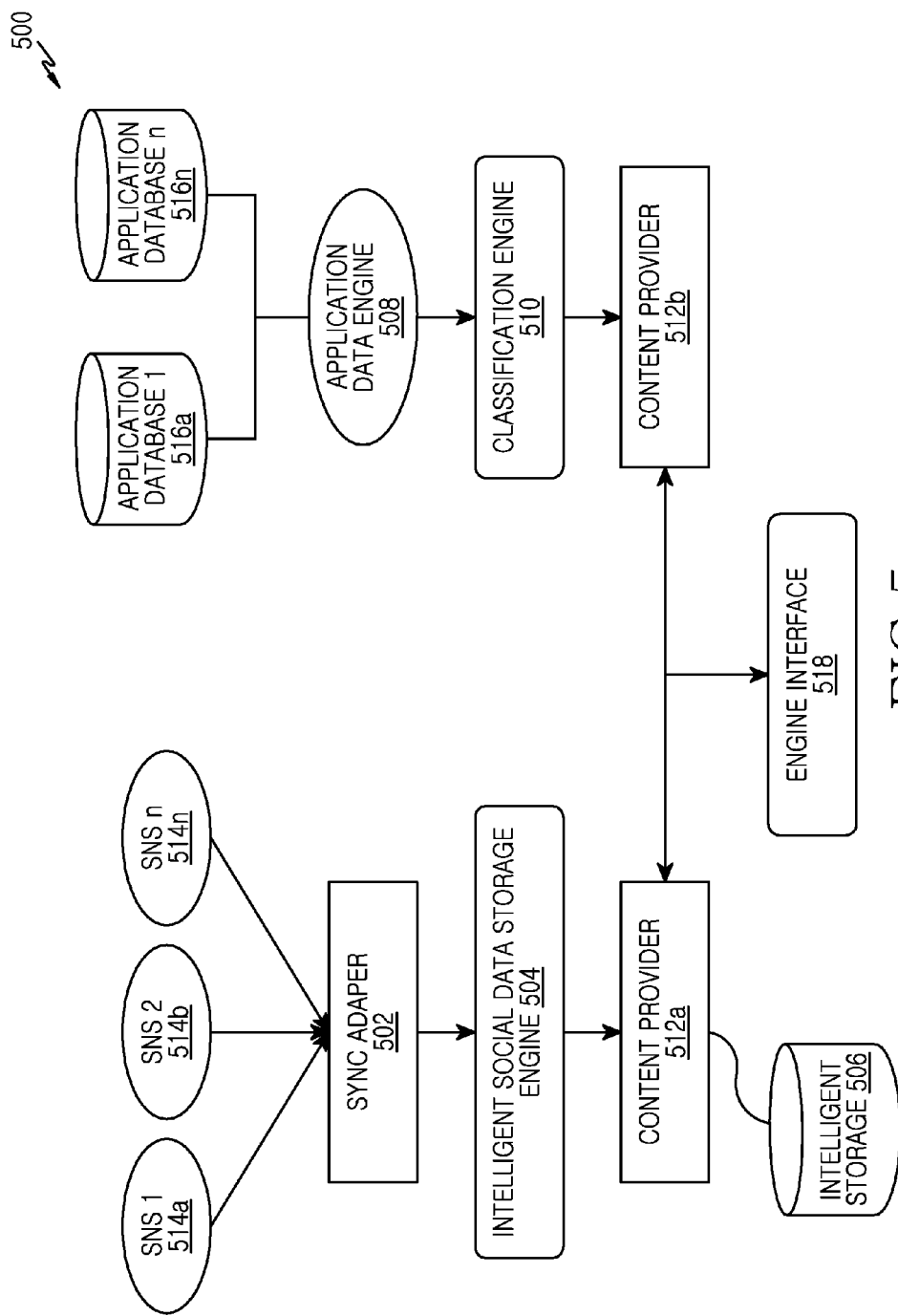
FIG. 5 illustrates a combinatorial data engine according to an embodiment of the present disclosure.

FIG. 5 illustrates a combinatorial data engine according to an embodiment of the present disclosure.

Referring to FIG. 5, a combinatorial data engine 500 can include, for example, a sync adaptor 502, an intelligent social data storage engine 504 (hereafter, referred to as a data storage engine), an intelligent storage 506, a native application data engine 508 (hereafter, referred to as an application data engine), a classification engine 510, content providers 512a and 512b, and an engine interface 518.

The sync adapter 502 can communicate with one or more SNSs 514a through 514n, identify the user profile, and thus gather the user information. The gathered information can be synced up together such that all the user information can be arranged accordingly without repeating any of the data, as the same data can be present in one or more profiles of different SNSs.

The intelligent social data storage engine 504 can receive the synced information from the sync adapter 502 and store the synced user information in the intelligent storage 506.

The data storage engine 504 can receive information from the user who wants to select the particular information from his/her profiles present in different SNSs. For example, the data storage engine 504 can automatically receive information from a micro controller and a Central Processing Unit (CPU) for selecting the information from the different SNSs.

The intelligent storage 506 can store the synced information of one or more users. For example, the intelligent storage 406 can include an internal storage of the electronic device, a database at a remote location, or a removable storage.

The native application data engine 508 can access one or more application databases 516a through 516n for accessing actual application data. The application data can include, for example, the user profile, user preferences, previous data sharing history, and the like.

The application data engine 508 can collect the application data and transmit the application data to the classification engine 510. The classification engine 510 can classify the collected data into required data and unrequired data, retain only the required data, and discard the unrequired data.

The required data can indicate data corresponding to the user interest obtained from the user profile. The data obtained from the SNSs 514a through 514n and stored in the intelligent storage 506 and the data obtained from the application databases 516a through 516n and classified by the classification engine 510 can be provided to the content providers 512a and 512b respectively.

The engine interface 518 can generate a query for receiving the synced information from the intelligent storage 506 and a query for receiving the classified application data from the classification engine 510.

The engine interface 518 can receive the synced and classified data from the content providers 512a and 512b respectively, and create the combinatorial data for particular users using the received data.

Figure 6:
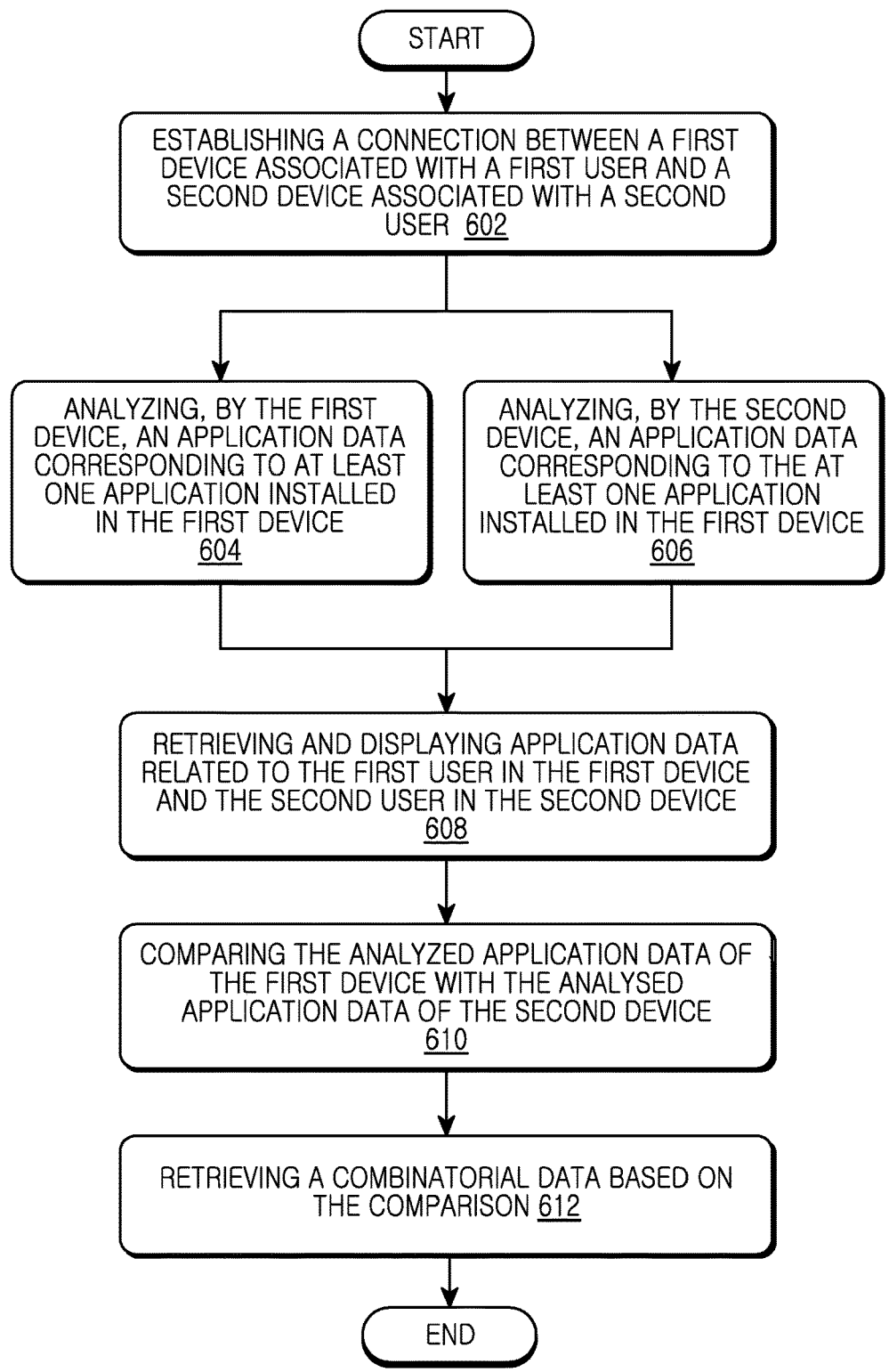
FIG. 6 is a flowchart of a data retrieving method of an electronic device according to an embodiment of the present disclosure.

FIG. 6 is a flowchart of a data retrieving method of an electronic device according to an embodiment of the present disclosure.

Referring to FIG. 6, in operation 602, the first electronic device 101 of the first user and the second electronic device 102 of the second user can establish the connection using various communications as aforementioned.

In operation 604, the first electronic device 101 can analyze the application data corresponding to the at least one application installed therein.

In operation 606, the second electronic device 102 can analyze the application data corresponding to the at least one application installed therein.

In operation 608, the first electronic device 101 can retrieve and display the application data relating to the first user, and the second electronic device 102 can retrieve and display the application data relating to the second user.

In operation 610, at least one of the first electronic device 101 and the second electronic device 102 can compare the application data analyzed by the first electronic device 101 with the application data analyzed by the second electronic device 102.

In operation 612, at least one of the first electronic device 101 and the second electronic device 102 can retrieve the combinatorial data based on the comparison.

Figure 7:
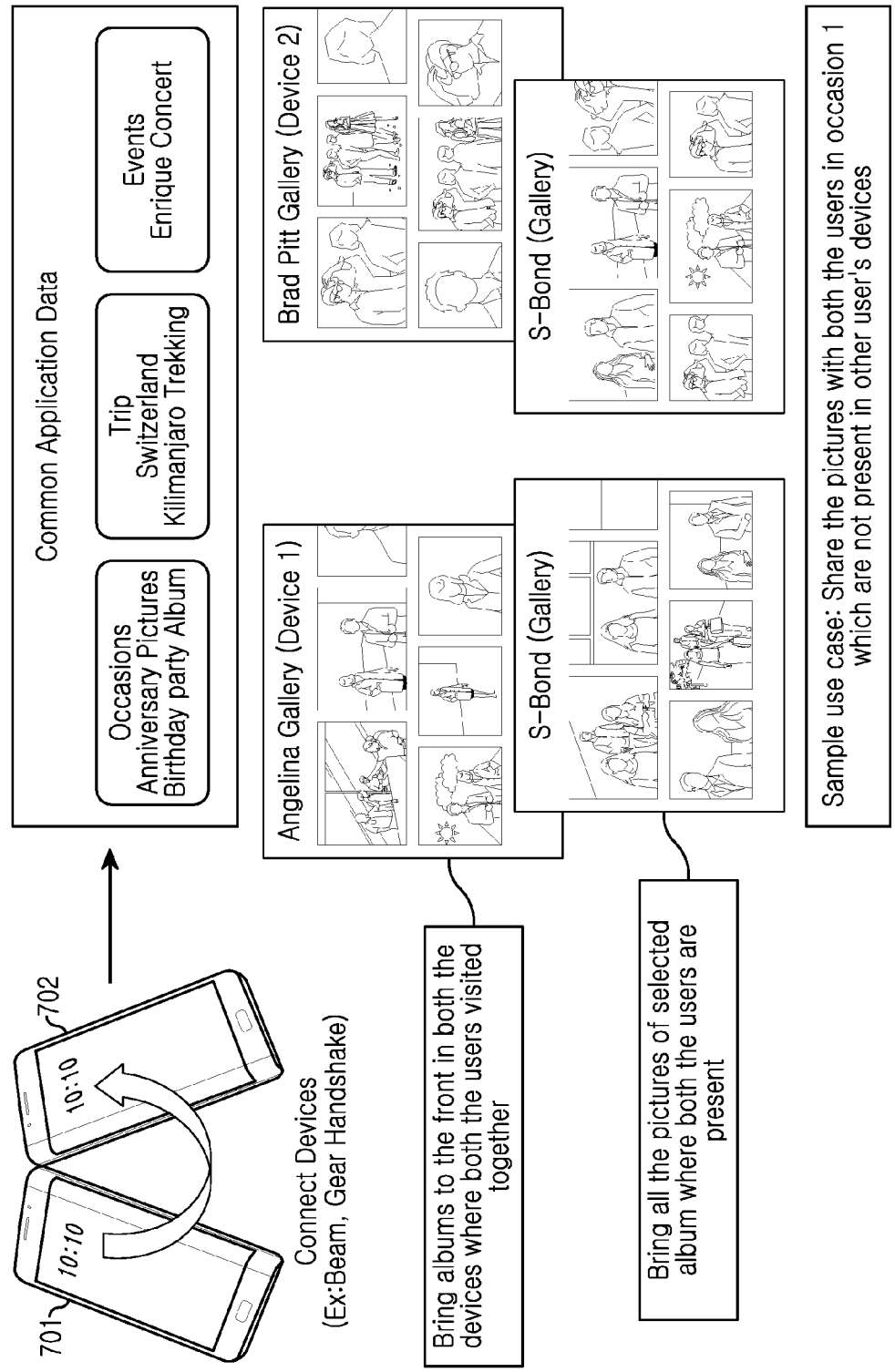
FIG. 7 illustrates a use case for using application data of a user gallery in a combinatorial data engine according to an embodiment of the present disclosure.

FIG. 7 illustrates a use case for using application data of a user gallery in a combinatorial data engine according to an embodiment of the present disclosure.

Referring to FIG. 7, a first electronic device 701 and a second electronic device 702 can set a user group through the connection using various communications (e.g., a handshake) as described earlier.

The first electronic device 701 can analyze a first user gallery stored therein, and the second electronic device 702 can analyze a second user gallery stored therein. A first user of the first electronic device 701 and a second user of the second electronic device 702 can view and share their intended combinatorial data in the respective electronic devices.

The first electronic device 701 and the second electronic device 702 can, when they are connected, identify user profile information. The user profile information can include various application data, such as solo images, group images, particular images, and the like.

The particular image can be the combinatorial data of the common interest between the first user and the second user. The combinatorial data, which is the application data of the common interest between the first user and the second user, can include various media contents, such as videos, wallpapers, documents, audio files, and the like.

The first electronic device 701 and the second electronic device 702 can determine common application data from various applications by analyzing the respective user profile information. For example, the common application data can be extracted as the inclusive combinatorial data including parties, trips and events commonly participated by the first user and the second user.

For example, when the first user and the second user select a birthday party album of the gallery as the common application data, the first electronic device 701 and the second electronic device 702 can retrieve and extract various applications including images from the birthday party album of the gallery.

The user input can, for example, retrieve a photo taken together with the second user with whom the first user wants to share the photo. Based on the user input, the first electronic device 701 and the second electronic device 702 can retrieve and share particular photos including both of the first user and the second user, in their respective devices.

The first user can want to share a particular photo including the first user and a third user. According to the corresponding user input, the first electronic device 701 and the second electronic device 702 may retrieve and share the particular photos including the first user and the third user.

For example, data of the particular photos retrieved in the first electronic device 701 and the second electronic device 702 can be exchanged in various formats, such as an Extensible Markup Language (XML), a Hyper Text Markup Language (HTML), a JPEG, a PNG, and the like. The first electronic device 701 and the second electronic device 702 can compare the retrieved data respectively, and identify and share the exclusive combinatorial data which are present in neither of the devices.

Figure 8:
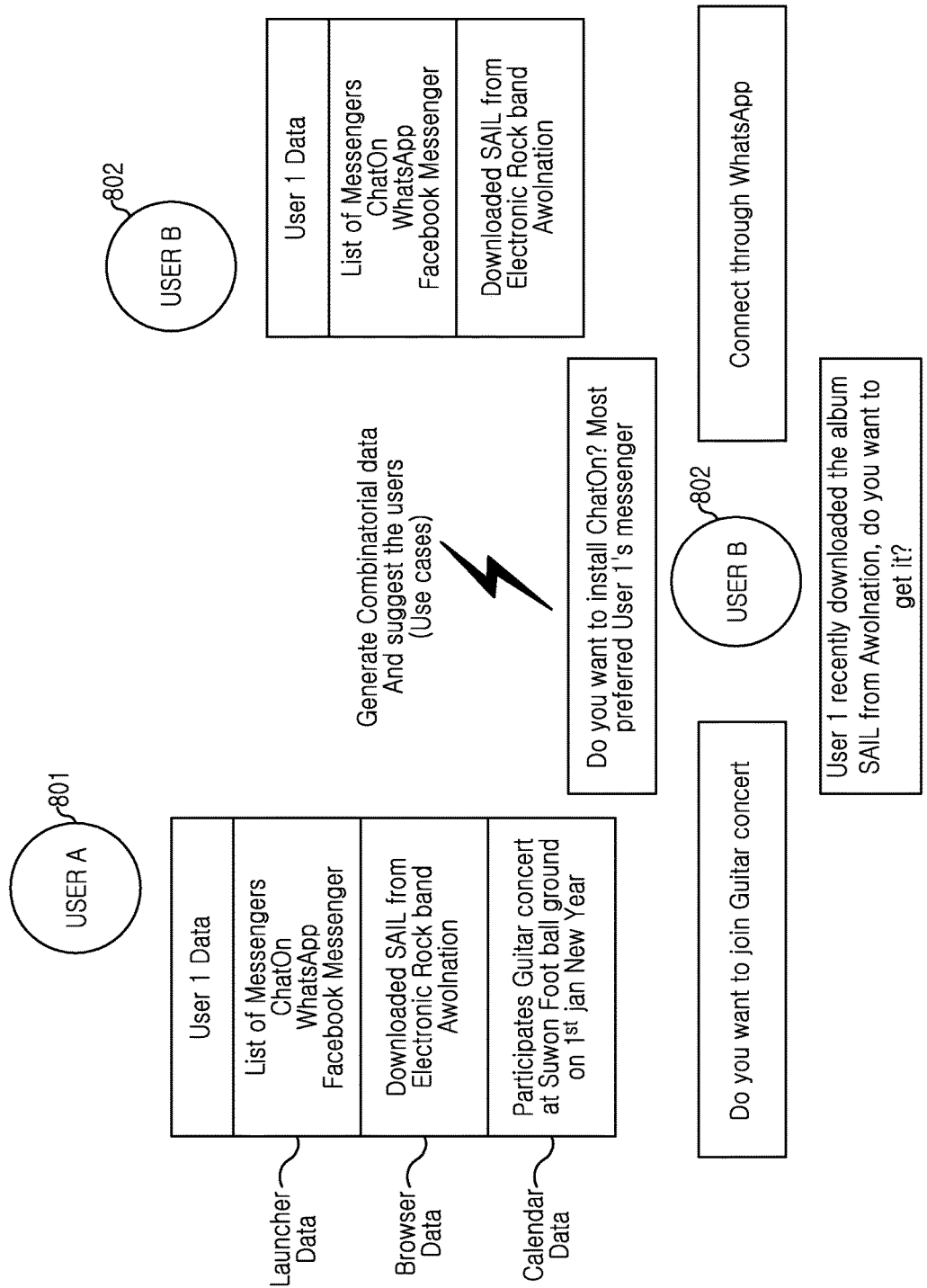
FIG. 8 illustrates a use case for generating combinatorial data by retrieving data from one or more applications according to an embodiment of the present disclosure.

FIG. 8 illustrates a use case for generating combinatorial data by retrieving data from one or more applications according to an embodiment of the present disclosure.

Referring to FIG. 8, a first user of a first electronic device 801 and a second user of a second electronic device 802 can share combinatorial data of their common interest.

For example, as stated earlier, the first electronic device 801 and the second electronic device 802 can install a plurality of applications (e.g., photos and music) and store application data (e.g., image files and audio files) corresponding to the applications.

When at least one of the first user and the second user taps or handshakes the first electronic device 801 and the second electronic device 802, the first electronic device 801 and the second electronic device 802 can be connected to create one user group.

After creating the one user group, the first electronic device 801 and the second electronic device 802 can retrieve a list of messenger applications in the respective devices and display a common messenger application, such as 'WhatsApp' so that the users can be immediately connected and exchange their information (e.g., the preference information or the favorites information).

Referring to FIG. 8, the first electronic device 801 can identify the most preferred application (e.g., 'ChatOn') of the first user and communicate with the second electronic device 802 so that the second user can install the particular application (e.g., 'ChatOn') in the second electronic device 802.

Further, various applications can be identified, application data corresponding to the identified applications can be retrieved, and thus the combinatorial data can be generated.

The first electronic device 801 and the second electronic device 802 can extract user IDs logged in the devices, from the profiles of various SNSs, for example, Google, Facebook, and LinkedIn, and the user ID can be shared between the devices of the user group.

Using the shared user IDs, the first electronic device 801 and the second electronic device 802 can retrieve contact information and profile information of the users. Further, the individual device can retrieve the combinatorial data including both of the common data and the non-common data between the first user and the second user in the individual application based on the profile information.

The first electronic device 801 and the second electronic device 802 can automatically identify one or more applications and SNSs, and provide unique common activity and interest information.

For example, the first user and the second user are interested in a particular music artist (e.g., 'Enrique'), collect audio files of the particular music artist, and have travelled together through a particular place (e.g., 'Kilimanjaro').

Classifying the interests and identifying the similar interests between the first user and the second user can be considered as a first menu hierarchy. For example, when one or more of the first user and the second user selects the trip traveling together at the particular place (e.g., 'Kilimanjaro'), the photo including both of the first user and the second user can be extracted in the first electronic device 801 and the second electronic device 802 respectively, provided to one or more of the first user and the second user, and be considered as a second menu hierarchy.

All the data extracted from the first electronic device 801 and the second electronic device 802 can be present within the electronic devices, displayed through a display of the individual electronic device, and shared between the devices or restricted for the user privacy protection based on the user ID.

When the user wants to know particular interest information to be gathered by the first electronic device 801 and the second electronic device 802, the first user and the second user can share category information to be used to classify the combinatorial data as XML and thus obtain the particular interest information in the respective devices. The category information of the particular interest shared using XML can be automatically shared regardless of the user input.

The first electronic device 801 and the second electronic device 802 can compare and classify the category information into, for example, a first content including only the first user, a second content including only the second user, and a third content including both of the first user and the second user. Herein, the content can include various application data (e.g., photos, audio files, videos, and SNS messages).

One or more of the first electronic device 801 and the second electronic device 802 can initiate a combinatorial service after boot up when the device is idle.

The combinatorial service can include identifying all the individual interest of the user, identifying the application data content of the individual interest, indexing the identified content, and constructing XML to share the category information of the individual interest, in each device.

Figure 9:
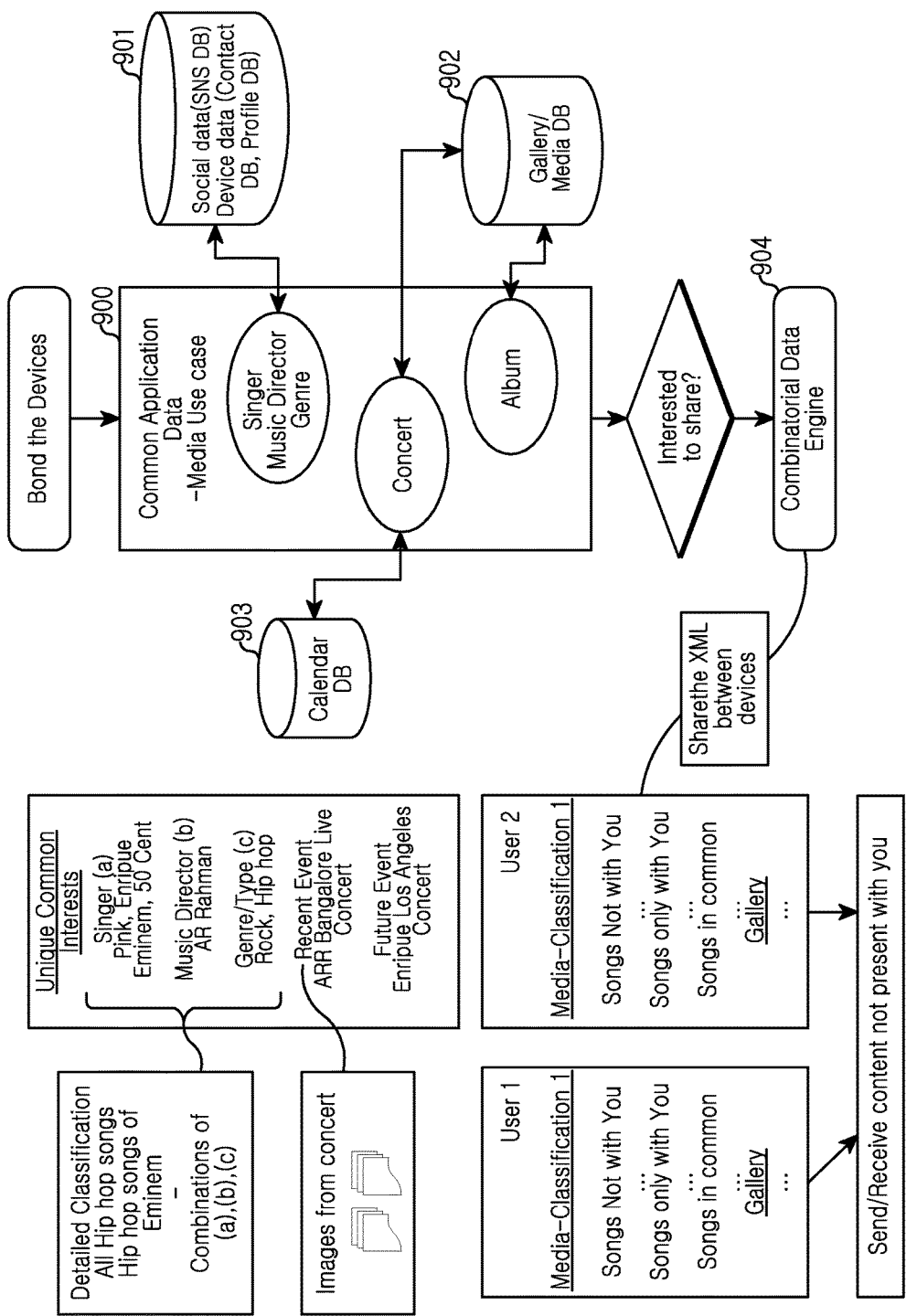
FIG. 9 illustrates a use case for generating combinatorial data by retrieving data from one or more social network applications according to an embodiment of the present disclosure.

FIG. 9 illustrates a use case for generating combinatorial data by retrieving data from one or more social network applications according to an embodiment of the present disclosure.

Referring to FIG. 9, the first electronic device and the second electronic device can, when they are connected, identify their users and user profile information.

Using the identified user profile information, the first electronic device 101 and the second electronic device 102 can determine common application data 900 from various databases. For example, the database can include a social database/device database 901, a gallery/media database 902, and a calendar database 903 as shown in FIG. 9.

The common application data 900 can include a singer, a music director, a genre, a concert, and an album corresponding to the common interest of the first user and the second user. For example, as shown in FIG. 9, the common application data 900 can be classified into details including the singer (a), the music director (b), and the genre/type (c), current events including concert images, and further events, as the unique common interest between the first user and the second user.

When the user selects the inclusive combinatorial data individually extracted, the first electronic device 101 and the second electronic device 102 can retrieve detailed classification and content. The retrieved content can be processed to determine the combinatorial data between the first electronic device 101 and the second electronic device 102. Thereafter, a combinatorial data engine 904 can share contents of the first electronic device 101 and the second electronic device 102 with the other electronic devices, process the inclusive combinatorial data extracted from the electronic devices, fetch exclusive combinatorial data, and share the combinatorial data among the electronic devices.

For example, the first electronic device 101 and the second electronic device 102 each can determine media available only with the first user and not with second user (e.g., media played by the first electronic device 101 and but not by the second electronic device 102) and vice versa, and media available to the first user and the second user in common.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a non-transitory machine readable medium. For example, the various electrical structure and methods may be embodied using transistors, logic gates, and electrical circuits, such as an application specific integrated circuit.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   determining whether to share application data of an application of the electronic device, based on authentication between the electronic device and another electronic device;
   in response to determination to share the application data, identifying first application data among the application data based on a privacy level corresponding to a user identifier (ID) of the another electronic device;
   receiving, from another electronic device, information regarding second application data which includes at least one image file or at last one audio file and is adapted to be used in at least one application of the another electronic device when the electronic device and the another electronic device are connected to each other;
   determining, by the electronic device, common criterion information on at least one of a time when the at least one image file is captured or the at least one audio file is recorded or a place where the at least one image file is captured or the at least one audio file is recorded;
   selecting, by the electronic device, at least part of the first application data which is adapted to be used in the at least one application of the electronic device and is stored in the electronic device, wherein the at least part of the first application data comprises at least one of at least one image file that is captured on the time associated with the common criterion information or in the place associated with the common criterion information, or at least one audio file is recorded on the time associated with the common criterion information or in the place associated with the common criterion information; and
   transmitting, by the electronic device, to the another electronic device, the at least part of the first application data.

2. The method of claim 1, wherein the determining of the common criterion information comprises:
   analyzing the first application data adapted to be used in the application of the electronic device; and
   determining the common criterion information by comparing the analyzed second application data and the received information.

3. The method of claim 2, wherein, based on user profile information, the analyzing of the first application data adapted to be used in the application of the electronic device comprises analyzing at least one of a frequency of accessing the first application data, a data amount, or a relevancy between a first user of the electronic device and a second user of the another electronic device.

4. The method of claim 1,
   wherein the application of the electronic device or the application of the another electronic device comprises a photo application,
   wherein the common criterion information comprises at least one of a scene, an event or a place associated with photos stored in the electronic device and the another electronic device, and
   wherein the at least part of the first application data to be transmitted to the another electronic device comprises at least one photo categorized by the common criterion information and stored only in the electronic device.

5. The method of claim 1, further comprising:
   providing a service to suggest at least one of a messenger, a file to be downloaded and a schedule, based on the common criterion information,
   wherein the application of the electronic device or the application of the another electronic device comprises at least one of a messenger application, a browser application or a calendar application, and
   wherein the common criterion information comprises at least one of a list of messengers, downloaded file information and a scheduled event.

6. The method of claim 1, wherein the transmitting of the at least part of the second application data comprises:
   retrieving, at the electronic device, at least part of the first application data associated with the common criterion information;
   transmitting list information of the retrieved at least part of the first application data to the another electronic device;
   receiving, from the another electronic device, request list information requested to be transmitted; and
   transmitting the at least part of the first application data requested by the another electronic device, to the another electronic device based on the request list information.

7. The method of claim 1,
   wherein the application of the electronic device or the application of the another electronic device comprises a media player application,
   wherein the common criterion information comprises at least one of an artist, a director or a genre associated with media files stored in the electronic device and the another electronic device, and
   wherein the at least part of the first application data transmitted to the another electronic device comprises at least one media file categorized by the common criterion information and stored only in the electronic device.

8. The method of claim 1, wherein the determining of the at least part of the first application data to be shared with the another electronic device comprises:

determining whether to transmit the at least part of the first application data, based on device authentication or user authentication between the electronic device and the another electronic device.

9. The method of claim 8, wherein the user authentication is performed based on profile information stored in the electronic device and profile information stored in the another electronic device.

10. The method of claim 1, further comprising:
creating, by the electronic device, a user group including the another electronic device in a certain region where the electronic device locates or in a different region from where the electronic device locates via a server through a network.

11. At least one non-transitory computer readable storage medium for storing a computer program of instructions configured to be readable by at least one processor for instructing the at least one processor to execute a computer process for performing the method of claim 1.

12. The method of claim 1, wherein the first application data includes at least one image including both of a first user of the electronic device and a second user of the another electronic device when the common criterion information on the at least one object includes the first user and the second user.

13. The method of claim 1, further comprising:
setting the electronic device to communicate with the another electronic device only during a period of a designated event.

14. An electronic device comprising:
a communication module;
a display module;
a storage; and
at least one processor associated with the communication module, the display module, and the storage,
wherein the at least one processor is configured to:
determine whether to share application data of an application of the electronic device, based on authentication between the electronic device and another electronic device;
in response to determination to share the application data, identify first application data among the application data based on a privacy level corresponding to a user identifier (ID) of the another electronic device;
receive, from another electronic device, information regarding second application data which includes at least one image file or at last one audio file and is adapted to be used in at least one application of the another electronic device when the electronic device and the another electronic device are connected to each other,
determine common criterion information on at least one of a time when the at least one image file is captured or the at least one audio file is recorded or a place where the at least one image file is captured or the at least one audio file is recorded,
select at least part of the first application data which is adapted to be used in the at least one application of the electronic device and is stored in the electronic device based on the common criterion information, wherein the at least part of the first application data comprises at least one of at least one image file that is captured on the time associated with the common criterion information or in the place associated with the common criterion information, or at least one audio file is recorded on the time associated with the common criterion information or in the place associated with the common criterion information, and
transmit, to the another electronic device, at least part of the first application data.

15. The electronic device of claim 14, wherein the at least one processor is further configured to:
analyze the first application data adapted to be used in the at least one application of the electronic device, and
determine the common criterion information by comparing the analyzed second application data and received information.

16. The electronic device of claim 15, wherein, based on user profile information, the at least one processor is further is configured to analyze at least one of a frequency of accessing the first application data, a data amount, and a relevancy between a first user of the electronic device and a second user of the another electronic device.

17. The electronic device of claim 14,
wherein the application of the electronic device or the application of the another electronic device comprises a photo application,
wherein the common criterion information comprises at least one of a scene, an event or a place associated with photos stored in the electronic device and the another electronic device, and
wherein the at least part of the second application data to be transmitted to the another electronic device comprises at least one photo categorized by the common criterion information and stored only in the electronic device.

18. The electronic device of claim 14,
wherein the at least one processor is further configured to provide a service to suggest at least one of a messenger, a file to be downloaded and a schedule, based on the common criterion information,
wherein the application of the electronic device or the application of the another electronic device comprises at least one of a messenger application, a browser application or a calendar application, and
wherein the common criterion information comprises at least one of a list of messengers, downloaded file information and a scheduled event.

19. The electronic device of claim 14, wherein the at least one processor is further configured to:
retrieve at least part of the first application data associated with the common criterion information from the storage;
transmit list information of the retrieved at least part of the first application data to the another electronic device;
receive, from the another electronic device, request list information requested to be transmitted; and
transmit the at least part of the first application data requested by the another electronic device, to the another electronic device based on the request list information.

20. The electronic device of claim 14,
wherein the application of the electronic device or the application of the another electronic device comprises a media player application,
wherein the common criterion information comprises at least one of an artist, a director and a genre associated with media files stored in the electronic device and the another electronic device, and
wherein the at least part of the first application data transmitted to the another electronic device comprises at least one media file categorized by the common criterion information and stored only in the electronic device.

21. The electronic device of claim 14, wherein the at least one processor is further configured to determine whether to transmit the at least part of the first application data, based on device authentication or user authentication between the electronic device and the another electronic device.

22. The electronic device of claim 21, wherein the user authentication is performed based on profile information stored in the electronic device and profile information stored in the another electronic device.

23. The electronic device of claim 14, wherein the electronic device and the another electronic device are configured to create a user group including the another electronic device in a certain region where the electronic device locates or in a different region from where the electronic device locates via a server through a network.

24. The electronic device of claim 14, wherein the first application data includes at least one image including both of a first user of the electronic device and a second user of the another electronic device when the common criterion information on the at least one object includes the first user and the second user.

25. The electronic device of claim 14, wherein the at least one processor is further configured to set the electronic device to communicate with the another electronic device only during a period of a designated event.

* * * * *